July 16, 1946.    A. THOMAS    2,404,006

TOOL CHUCK

Filed April 3, 1944

INVENTOR
Albert Thomas
by his attorneys
Stebbins, Blenko & Webb

Patented July 16, 1946

2,404,006

UNITED STATES PATENT OFFICE 2,404,006

TOOL CHUCK

Albert Thomas, Munhall, Pa., assignor to James J. Duane, Pittsburgh, Pa.

Application April 3, 1944, Serial No. 529,336

4 Claims. (Cl. 279—60)

This invention relates to a chuck and, in particular, to a chuck such as that used in machine-shop practice for holding a tool such as a drill.

The object of my invention is to improve generally upon existing types of tool chucks and to provide a chuck having special advantages over those now in use, particularly from the standpoint of effective gripping power, simplicity of construction and low cost of manufacture. In a preferred embodiment, my chuck comprises a cylindrical body having a bore therein and circumferentially spaced holes therethrough inclined to the axis of the body. Jaws reciprocable in the holes are actuated by a screw threaded into a shank rotatably disposed in the body. The screw has a flange with radial slots and the jaws have slots on opposite sides so that the slots in the screw flange are adapted to accommodate the portion of the jaws remaining between the slots therein.

A complete understanding of the invention may be gained from the following detailed description which refers to the accompanynig drawing illustrating the preferred embodiment.

In the drawing,

Figure 3 is another view of one of the jaws as projected on a plane at right angles to that from which Figure 2 is taken;

Figure 1:
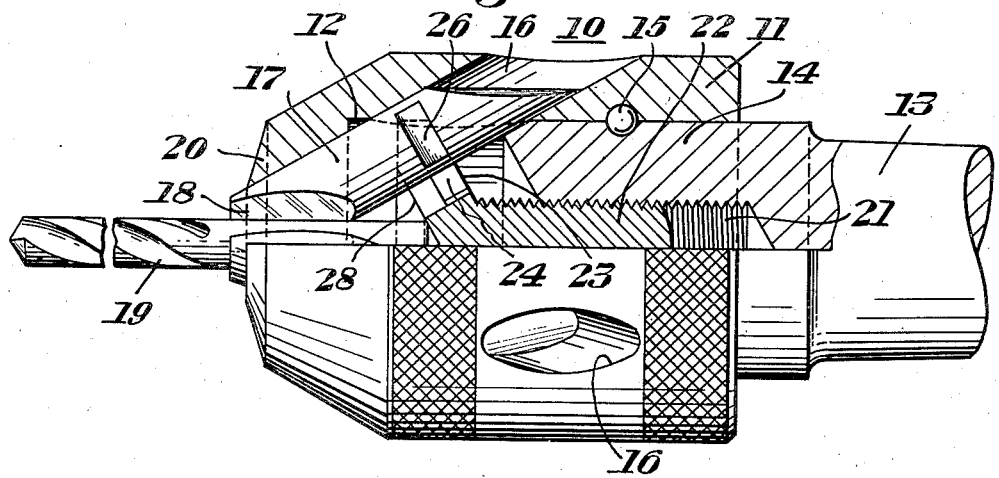
Figure 1 is a longitudinal half section with parts in elevation, the sectional portion being taken along a plane defined by the axis of the chuck body and the axis of one of the jaws.
Figure 2:
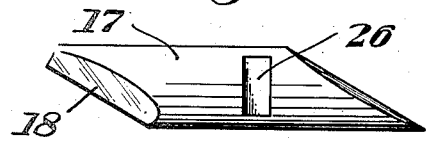
Figure 2 is a detailed view of one of the jaws.
Figure 3:
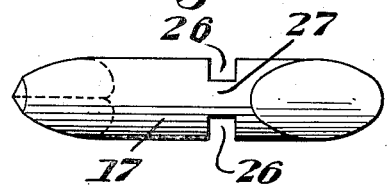
Figure 4:
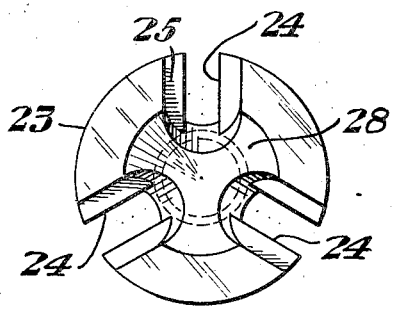
Figure 4 is an end elevation of the screw.
Figure 5:
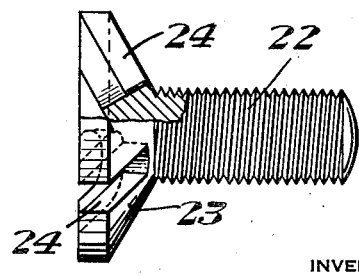
Figure 5 is a side elevation partly broken away.

Referring in detail to the drawing, the chuck of my invention indicated generally at 10 comprises a generally cylindrical body 11 having an axial bore 12 extending thereinto from one end, leaving a side wall and one end wall. A shank 13 adapted to be inserted in the spindle of a drill press, for example, has a cylindrical portion 14 rotatably disposed in the bore 12. The portion 14 and the bore 12 are grooved to accommodate a series of balls 15 which provide a combined radial and thrust bearing. The balls may be placed in the annular passage provided by the grooves, through a radial hole in the body 11, adapted to receive a screw plug, in the customary manner.

Holes 16 inclined to the axis of the bore 12 are spaced circumferentially of the body 11. Jaws 17 are slidable in the holes 16. The jaws are composed of lengths of round bar beveled on an angle at one end as indicated at 18 whereby a plurality of jaws are adapted to grip a tool such as a drill 19. It will be understood that the holes 16 penetrate the nose 20 of the body 11, permitting the jaws to protrude slightly as shown, if necessary. The intersection of the holes 16 with the end of the nose 20 provides space for the insertion of the shank of the drill between the jaws.

The cylindrical portion 14 of the shank 13 has a tapped axial bore 21 extending into the inner end thereof and adapted to receive a screw 22 having a left-hand thread. The screw has a conical flange 23 in which radial slots 24 are formed, the angle between adjacent slots being the same as that between adjacent jaws 17. The interior surface of the flange is milled out adjacent the slots as at 25 to reduce the thickness of the flange locally, without weakening the remainder thereof.

The jaws 17 have opposed slots 26 intermediate the ends thereof, the sides of the slots being normal to the longitudinal axes of the jaws and the bottoms of the slots being parallel to a plane containing the beveled edge 18 and the axis. The slots 24 are wide enough to accommodate the section of metal left between the bottoms of the slots 26, indicated at 27.

The assembled relation of the parts is as shown in Figure 1. It will be clear from the latter that rotation of the body 11 relative to the shank 13 will drive the screw 22 causing it to move axially of the shank. This movement of the screw actuates the jaws in the holes 16 by virtue of the engagement of the edges of the slots 24 in the flange 23 with the sides of the slots 26 in the jaws. It will be apparent that the resulting longitudinal movement of the jaws causes their beveled edges to approach or separate, depending on the direction of movement of the screw 22. Instead of rotating the body 11 relative to the shank, the body may be held stationary and the shank rotated. The use of a left-hand thread on the screw 22 thus makes the chuck self-tightening since the rotation of the shank 13 will ordinarily be in the right-hand or clockwise direction, thereby tending to advance the screw and force the jaws into firm engagement with the drill.

The flange 23 is recessed at 28 for engagement by the end of the drill 19. It will be understood that, in using the chuck, the jaws are retracted sufficiently to permit easy insertion of the drill until it abuts against the flange. When the chuck is then tightened down, as explained above, the advance of the screw pushes the drill outwardly between the jaws until the latter obtain a firm grip thereon, preventing further relative rotation between the screw and shank 13.

It will be evident from the foregoing that my chuck has numerous advantages over similar devices known heretofore, in addition to the self-tightening characteristic already referred to. A further advantage results from the fact that the diameter of the flange 23 on the screw 22 is only sufficiently smaller than that of the bore 12 to permit free movement therein. Upon any slight deflection of the flange resulting from the application of pressure to the jaws, the peripheral edge of the flange 23 comes into bearing with the interior of the bore 12, thereby preventing any further deflection. The bearing cone on the screw provides a positive backing on the shank for the inner end of the drill. A further advantage resides in the fact that the back pressure or reaction of the axial force applied to the tool is transmitted from the jaws to the chuck body and thence through the bearing balls to the shank, thereby tending to square and center the body relative to the shank, and eliminate any inaccuracy or wobbling resulting from lost motion or play between these parts.

In addition to the foregoing, the chuck is of very simple construction, requiring only four different types of of parts, viz., the body, shank, screw and jaws. All the jaws are identical. The chuck may thus be manufactured at relatively low cost. Under test, it exhibits a gripping power greater than that of any comparable chuck previously available.

Although I have illustrated and described but a preferred embodiment of my invention, it will be recognized that changes therein may be made without departing from the scope of the appended claims or the spirit of the invention.

I claim:

1. In a tool chuck comprising a shank adapted to be attached to the spindle of a machine tool and having a concentric threaded bore in its free end, a body carried by said end of said shank and adapted for rotation with respect to said shank, tool gripping jaws, the gripping surfaces of which are substantially coaxial with said shank, supported in said body and adapted to move inwardly to grip the sides of a tool between its ends upon relative rotation of said shank and body in one direction; a jaw actuating screw cooperating with said jaws and threaded into said bore and having jaw actuating recesses and a coaxial frustro-conical recess in its outer end, the wall of which is adapted to engage the peripheral edge of the adjacent end of a machine tool to force the tool into coaxial relation to said shank so the tool will be rigidly held at axially spaced areas to assure coaxial alignment of the tool in spite of stresses encountered in operation.

2. An actuating screw for a tool chuck comprising a threaded body adapted to be threadedly associated with the shank of said chuck; a conical flange extending forwardly from one end of said body and providing a frustro-conical end recess adapted to engage the peripheral end edge of the tool and center and support the tool.

3. An actuating screw for a tool chuck comprising a threaded body adapted to be threadedly associated with the shank of said chuck; a flange at one end provided with radial slots to receive the gripping jaws of said chuck and terminating in a cylindrical bearing surface adapted to engage the chuck body.

4. In a tool chuck comprising a shank having an axial threaded bore in one end, a body member rotatably supported on said one end and having a tool receiving portion overhanging said one end and gripping jaws carried by said body; a jaw actuating screw threaded into said bore and having a conical flange operatively cooperating with said jaws and terminating in a cylindrical bearing surface in axial alignment with the periphery of said shank, said screw being threaded so as to tighten the jaws in operation and simultaneously distort said cylindrical bearing surface into firm engagement with said body as the jaws are tightened to support the body in coaxial alignment with the shank, whereby substantially the full torque is available to tighten the chuck.

ALBERT THOMAS.